Patented Mar. 3, 1953

2,630,410

UNITED STATES PATENT OFFICE 2,630,410

NONGELLING AQUEOUS SILICA SOLS STABILIZED WITH BORON COMPOUNDS

Leo J. Clapsadle, Kenmore, and Michael G. Syracuse, Buffalo, N. Y., assignors, by mesne assignments, to Union Carbide and Carbon Corporation, a corporation of New York No Drawing. Application April 19, 1949, Serial No. 88,486

16 Claims. (Cl. 252—313)

This invention relates to aqueous silica sols stabilized against gelling and to methods of preparing such sols.

Dispersions of colloidal silica in water are important items of technical usage. The dispersions are frequently used at low concentrations, i. e. between 1 and 10 parts by weight of silica with sufficient water to make 100 parts, in the sizing of cloth, paper and other materials where a silica size is desired. The dispersions may also be used at higher silica concentrations but whatever the concentration of final use, it is highly desirable to prepare an initial sol of high silica content to minimize packaging, shipping and handling costs. However, concentrated silica sols tend to gel when stored; and it is difficult if not impossible to redisperse the gel form to the sol form.

It has been proposed to produce aqueous silica sols from aqueous solutions of sodium silicate by ion exchange or similar methods, the colloidal silica being formed in the sodium silicate-water system. However, it is found that aqueous silica sols may be obtained more simply by first producing silica by suitable decomposition of silicon compounds and then properly dispersing in water the silica thus prepared, under conditions to yield a concentrated aqueous silica sol. But it is found that the concentrated aqueous sols thus prepared are not stable with respect to gelling and that they cannot effectively be stabilized against this tendency by the addition of ammonia or water-soluble amines or similar materials which have been proposed for the stabilization of sols produced from water-soluble silicate systems.

We have found that highly concentrated yet non-gelling aqueous silica sols can be prepared by first burning or otherwise decomposing silicon compounds under such conditions that small silica particles are formed, preferably of colloidal size. These particles are then dispersed in water under such conditions that all of the particles have no dimension greater than $1 \times 10^{-5}$ inch. At the time that the dispersion is prepared or shortly thereafter and, in all events, prior to the formation of a gel, a small amount of boric acid or of sodium perborate or sodium tetraborate is incorporated into the sol. The amount of such boron compound does not undesirably change any property of the sol.

The silica may be produced by suitably burning or otherwise decomposing a combustible or easily decomposable organic or inorganic silicon compound, for instance trichloro-silane, $SiHCl_3$; silane, $SiH_4$, or disilane, $Si_2H_6$; ethyl silicate, $Si(OC_2H_5)_4$; alkylsilanes as tetramethylsilane, $Si(CH_3)_4$, and tetraethylsilane, $Si(C_2H_5)_4$; and other silicon compounds, as silicon chloride, $SiCl_4$. The chlorine may be replaced with bromine or iodine, in whole or in part.

The preferred silicon compounds are those which upon proper decomposition yield only silica and volatile by-products, as silane upon oxidation yields only silica and water vapor; ethyl silicate yields only silica, water vapor and carbon monoxide or dioxide; and trichlorosilane yields only silica, water vapor and HCl gas. The decomposition of a silicon compound containing carbon is preferably under strongly oxidizing conditions in order that the silica is free from carbon particles. A suitable silica is obtained by burning trichlorosilane, silane, tetraethyl silicate or other combustible silicon compound in the presence of excess air, so that all of the silicon and carbon are oxidized, the silica depositing and being collected and other products passing away as gases.

The silica obtained by the preferred thermal decomposition is dry, pure $SiO_2$. If the decomposition of the silicon compounds is effected in the preferred manner, the average diameter of the average particle is $1 \times 10^{-6}$ inch (measured by sedimentation methods) and a gram of the particles will have a surface area of at least 100 square meters. The greatest permissible average particle size for sols prepared in accordance with the present invention is $1 \times 10^{-5}$ inch and the minimum permissible surface area of 1 gram of the particles is 100 square meters.

With properly prepared silica, aqueous dispersions containing up to 30% silica may easily be prepared by thoroughly mixing the silica and water in any suitable manner. It is preferred to produce the sol by passing the silica and water through a colloid mill, for instance of the Eppenbach type, having a rotor to stator clearance of about 0.005 inch or less.

To prevent the silica sol from gelling, it should contain a small amount, for instance from 0.001 to 2.0% by weight of the weight of the sol, of boric acid or sodium tetraborate or sodium perborate, sodium tetraborate being preferred, on the basis of cost, over sodium perborate. For sols containing 5% or more of silica, the stabilizer is preferably and conveniently dissolved in the water used in making the sol, before the silica is dispersed in the water; but the stabilizer may be dispersed in a previously prepared sol. Sols containing less than 5% silica are preferably prepared by diluting a more concentrated sol.

When the salts are predominantly basic in character, that is when their cations are sodium or potassium, and they are used in such quantities as to give the sol an initial pH of between 7.5 and 8 or higher, the sol has a low viscosity, and this viscosity does not increase more than 25% upon standing for at least six weeks. In the case of sodium tetraborate the solids in the sol have a tendency to settle when the pH is between 7.5 and 8.0 but the sol is easily and completely reestablished merely by stirring the mass to redistribute the silica. In the acidic range where the initial pH of the sol is between 3.7 and 4.8 the initial viscosity is also low but the viscosity increases more rapidly than in the case of the predominantly basic stabilizers. With salts where the amount of salt is such that the pH is between 5.2 and 7.5, the initial viscosity of sol is comparatively high but does not change materially upon standing; and the same is true of sols containing boric acid in pH ranges between 3.1 and 3.5. If the pH of the sol containing no addition agent be considered as neutral, pH changes within the range from an increase in pH of slightly less than 1.2 to a decrease of slightly less than 0.6 give sols with initial viscosities below 500 millipoises. Also, with both the acid and the salts, where the pH of the sol is above 3.5 and below 5.3, the initial viscosity of the sol is below 500 millipoises and where the pH of the sol is from 3.8 to below 5.3 and the amount of additive is less than 0.025% and above 0.001%, the change in viscosity with the age of the sol is relatively gradual. In no case did the sols gel, even with the minimum amount of salt or acid. All viscosities may be increased or decreased with greater or lesser amounts of silica in the sol.

The effects of the anti-gel agents are illustrated in the following table for silica aquasols containing 20% silica by weight and 80% water and the various amounts of the agents indicated. The dispersions were prepared in the manner previously stated, that is by burning trichlorosilane, collecting the deposited silica, and dispersing it in water in a colloid mill having an 0.005 inch clearance between the rotor and stator, the water containing the proper amount of the anti-gel to give the composition indicated on the table. A 20% dispersion was chosen as representative of concentrated dispersions containing from 5 to 30% by weight of deposited and dispersed silica. After formation of the dispersions, each viscosity was determined immediately, at 12 days, and at 6 weeks after formation. The phrase "no gel" in the last column of the table indicates that the dispersions did not gel within six weeks.

*Stability of various 20% silica aquasols*

| Stabilizer | Initial pH | Viscosity, Millipoises at 25° C. | | | Time to Form Gel |
|---|---|---|---|---|---|
| | | Initial | 12 Days | 6 Weeks | |
| None | 4.1 | 42 | 1 500 | | 2½ wks. |
| 1% Na tetraborate | 8.5 | 28 | 28 | 30 | no gel. |
| 0.75% Na tetraborate | 8.4 | 20 | 20 | 25 | Do. |
| 0.5% Na tetraborate | 8.0 | 85 | 100 | 3 80 | settles. |
| 0.25% Na tetraborate | 7.5 | 1>500 | (2) | | Do. |
| 0.10% Na tetraborate | 6.8 | 1>500 | 1>500 | 1>500 | no gel. |
| 0.01% Na tetraborate | 5.2 | 458 | 1 500 | 1 500 | Do. |
| 0.001% Na tetraborate | 4.1+ | 100 | 395 | 1 500 | Do. |
| 1% Boric acid | 3.1 | 1>500 | 1>500 | 1>500 | Do. |
| 0.10% Boric acid | 3.5 | 1>500 | 1>500 | 1>500 | Do. |
| 0.05% Boric acid | 3.7 | 135 | 1>500 | 1>500 | Do. |
| 0.025% Boric acid | 3.8− | 90 | 1>500 | 1>500 | Do. |
| 0.01% Boric acid | 3.8 | 100 | 130 | 310 | Do. |
| 0.005% Boric acid | 3.8 | 50 | 300 | 1>500 | Do. |
| 0.001% Boric acid | 3.8+ | 80 | 1>500 | 1>500 | Do. |
| 1% Na perborate | 8.0 | 35 | 35 | 40 | Do. |
| 0.1% Na perborate | 6.1 | 1>500 | 1>500 | 1>500 | Do. |
| 0.01% Na perborate | 5.3 | 1>500 | 1>500 | 1>500 | Do. |
| 0.001% Na perborate | 4.8 | 70 | 370 | 1>500 | Do. |

1 500 millipoises is the upper limit of viscosity measurement made.
2 Settles out.
3 Settling.

The pH values on the table are given to the nearest tenth. In the case of the sol containing 0.001% sodium tetraborate, the average pH of a number of determinations was slightly above 4.1. For the sols containing 0.025% and 0.001% boric acid, the average pH values of the sols were, respectively, slightly below and slightly above 3.8 for a number of determinations. The additives referred to in the table are $H_3BO_3$, $Na_2B_4O_7$ and $NaBO_3 \cdot H_2O$. They may be replaced with such amounts of tetraboric acid and the various forms of the sodium and potassium tetra-, per-, and meta- borates of the various hydrations as give, in aqueous solution, corresponding amounts of boron in solution.

The viscosity of the silica aquasols is a function of the silica content as well as of the type and concentration of the anti-gel agent. Silica aquasols containing less than 20% silica will be less viscous than the 20% silica dispersions and the differences in viscosity obtained by varying the amount of silica will be less the lower the concentration of dispersed silica in the sols; and aquasols containing more than 20% silica will have higher viscosities and the change in viscosity will be greater for each per cent change in silica content the higher the silica concentration is above 20%.

Silica sols containing less than 5% silica are preferably prepared at the point of use by diluting more concentrated sols. Aquasols prepared by dispersing 2 parts of silica in 98 parts of water containing 0.001 part of any of the anti-gel agents disclosed herein, did not gel in a test, discontinued after two months, although the 2% sols settled to the extent that in columns four inches high, from ½ to ¾ of an inch of clear liquid was showing at the tops of the columns after six weeks. However, the sols settled no more than this during the test and immediately redispersed upon slight agitation and the ½ to ¾ inch of clear liquid did not appear for another six weeks. The settling and ability to redisperse is noted in sols containing up to 5 parts of silica in 95 parts of water containing 0.001 part of anti-gel agent. With dispersions containing more than 5% silica and 0.001% or more of anti-gel agent, there is no settling except, as noted in the table, in the case of sodium tetraborate. Sols containing as low as 2% to 5% silica and prepared by water dilution of more concentrated sols containing from 5 to 30 parts of silica, water to make 100 parts, and from 0.001 part to 2 parts of an anti-gel agent disclosed herein, showed no tendency either to gel or to settle in a test of two months during which time the vessels containing the sols were undisturbed.

By means of the anti-gel stabilizers disclosed herein, silica dispersions may be maintained for longer periods in the sol form and gelling is inhibited for prolonged periods. By the use of the anti-gel agents according to this invention, either basic, neutral or acidic non-gelling sols containing up to 30% by weight of silica may be prepared. Also, one may prepare non-gelling concentrated sols of comparatively high or low viscosity, which viscosities, during storage of the sol, either remain substantially constant or increase but not to a gelling condition.

We claim:
1. An aqueous silica sol composition consisting essentially of the sol and, in an amount effective to prevent gelation of the sol, a member of the group consisting of boric acids and alkali borates.

2. An aqueous silica sol composition consisting essentially of the sol and from 0.001% to 2% by weight of a member of the group consisting of boric acids and alkali borates.

3. An aqueous silica sol composition consisting essentially of silica in an amount up to 30% by weight of the total weight of the sol and also comprising, in an amount effective to prevent gelation of the sol, a member of the group consisting of boric acids and alkaliborates.

4. An aqueous silica sol composition consisting essentially of up to 30% of silica and from 0.001% to 2% of a member of the group consisting of boric acids and alkali borates, the percentages being by weight of the total weight of the sol.

5. An aqueous silica sol composition consisting essentially of the sol and sufficient of a member of the group consisting of boric acids and alkali borates to give the sol a pH higher than 7.5 and a viscosity below 500 millipoises at 25° C.

6. An aqueous silica sol composition consisting essentially of the sol and a member of the group consisting of boric acids and alkali borates, and having a pH above 3.5 and below 5.3 and characterized by a viscosity below 500 millipoises at 25° C.

7. An aqueous silica sol composition consisting essentially of the sol and less than 0.025% and more than 0.001% by weight based on the total weight of the sol, of a member of the group consisting of boric acids and alkali borates and having a pH from 3.8 to below 5.3.

8. An aqueous silica sol composition consisting essentially of up to 30% of silica and from less than 0.025% to more than 0.001% of a member of the group consisting of boric acids and alkali borates, and having a pH from 3.8 to less than 5.3, the percentages being by weight of the total weight of the sol.

9. The method of preparing an aqueous silica sol which consists essentially of dispersing colloidal silica in water together with a member of the group consisting of boric acids and alkali borates in sufficient amount to prevent gelation of the sol.

10. The method of preparing an aqueous silica sol which consists essentially of dispersing colloidal silica in water together with from 0.001% to 2% by weight based on the total weight of the sol a member of the group consisting of boric acids and alkali borates.

11. The method of preparing an aqueous silica sol which consists essentially of dispersing up to 30% by weight, based on the total weight of the sol, of colloidal silica in water together with a member of the group consisting of boric acids and alkali borates in sufficient amount to prevent gelation of the sol.

12. The method of preparing an aqueous silica sol which consists essentially of dispersing up to 30% of colloidal silica in water together with from 0.001% to 2% of a member of the group consisting of boric acids and alkali borates, the percentages being by weight of the total weight of the sol.

13. The method of preparing an aqueous silica sol which consists essentially of dispersing colloidal silica in water together with sufficient of a member of the group consisting of boric acids and alkali borates to give the sol a pH higher than 7.5 and a viscosity below 500 millipoises at 25° C.

14. The method of preparing an aqueous silica sol which consists essentially of dispersing colloidal silica in water together with sufficient of a member of the group consisting of boric acids and alkali borates to give the sol a pH above 3.5 and below 5.3 and a viscosity below 500 millipoises at 25° C.

15. The method of preparing an aqueous silica sol which consists essentially of dispersing colloidal silica in water together with such an amount, less than 0.025% and more than 0.001% by weight of the total weight of the sol, of a number of the group consisting of boric acids and alkali borates as to give the sol a pH from 3.8 to below 5.3.

16. The method of preparing an aqueous silica sol which consists essentially of dispersing up to 30% of collodial silica in water together with such an amount, less than 0.025% and more than 0.001%, of a member of the group consisting of foric acids and alkali borates as to give the sol a pH from 3.8 to below 5.3, the percentages being by weight of the total weight of the sol.

LEO J. CLAPSADLE.
MICHAEL G. SYRACUSE.

REFERENCES CITED

The following references are of record in the file of this patent:

UNITED STATES PATENTS

| Number | Name | Date |
|---|---|---|
| 2,348,647 | Reeves et al. | May 9, 1944 |
| 2,386,810 | Marisic et al. | Oct. 16, 1945 |
| 2,475,253 | Pierce | July 5, 1949 |

OTHER REFERENCES

"Colloid Chemistry," J. Alexander, vol. VI, Reinhold Pub. Co., N. Y., N. Y., pgs. 1113–1117.